(12) United States Patent
Takatsuka et al.

(10) Patent No.: US 8,684,057 B2
(45) Date of Patent: Apr. 1, 2014

(54) DRIVING APPARATUS OF BUILDING DRUM FOR TIRE

(75) Inventors: Tomoyuki Takatsuka, Osaka (JP); Hirokatsu Mizukusa, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 995 days.

(21) Appl. No.: 12/301,345

(22) PCT Filed: May 18, 2006

(86) PCT No.: PCT/JP2006/309919
§ 371 (c)(1),
(2), (4) Date: Apr. 3, 2009

(87) PCT Pub. No.: WO2007/135706
PCT Pub. Date: Nov. 29, 2007

(65) Prior Publication Data
US 2010/0000685 A1     Jan. 7, 2010

(51) Int. Cl.
*B29D 30/24*     (2006.01)

(52) U.S. Cl.
USPC ........ 156/414; 156/394.1; 156/398; 156/415; 156/416; 156/417

(58) Field of Classification Search
USPC ............... 156/394.1, 398, 414, 415, 416, 417
See application file for complete search history.

(56) References Cited

U.S. PATENT DOCUMENTS

| | | | |
|---|---|---|---|
| 3,971,694 A | 7/1976 | Gazuit | |
| 4,007,081 A * | 2/1977 | Mallory | 156/417 |
| 4,214,939 A * | 7/1980 | Enders | 156/398 |
| 5,770,004 A * | 6/1998 | Ogawa | 156/398 |
| 2007/0023966 A1* | 2/2007 | Girard et al. | 264/326 |

FOREIGN PATENT DOCUMENTS

| | | |
|---|---|---|
| JP | 61-173328 U | 10/1986 |
| JP | 7-148861 A | 6/1995 |
| JP | 8-25513 A | 1/1996 |
| JP | 2003-89158 A | 3/2003 |

OTHER PUBLICATIONS

L&S Electric Inc., L&S Glossary of Terms—B, obtained from http://www.lselectric.com/gloss_b.html.*
International Search Report of PCT/JP2006/309919, date of mailing Jul. 18, 2006.

* cited by examiner

*Primary Examiner* — Katarzyna Wyrozebski Lee
*Assistant Examiner* — Joshel Rivera
(74) *Attorney, Agent, or Firm* — Westerman, Hattori, Daniels & Adrian, LLP

(57) ABSTRACT

The invention is for enabling one piece of rotation driving means 17 to drive to rotate both of an outer side shaft portion 3 of a drum shaft 1 and a screw shaft 4 on an inner side as a driving apparatus 10 of a tire building drum D, including an outer shaft 13 connected to the outer side shaft portion 3, a middle shaft 14 connected to the screw shaft 4, one piece of the rotation driving means 17 connected to the middle shaft 14 by way of a rotation transmitting member 18, and a clutch 26 interposed between the rotation transmitting member 18 connected to the middle shaft 14 and the outer shaft 13, and constituted to transmit rotation of the rotation driving means 17 to both of the middle shaft 14 and the outer shaft 13 in connecting the clutch 26 and transmit the rotation of the rotation driving means 17 only to the middle shaft 14 in cutting the clutch 26.

7 Claims, 4 Drawing Sheets

DRIVING APPARATUS OF BUILDING DRUM FOR TIRE

TECHNICAL FIELD

The present invention relates to a driving apparatus of a building drum for a tire constituted by providing a pair of left and right drum portions having bead lock means for respectively holding both side bead portions of a green case intermediate building member of a tire to be able to be proximate to and distant from each other.

BACKGROUND ART

In a background art, in building steps of fabricating a tire, there is known a building method of building a carcass band in a shape of a circular cylinder as a tire constituting member by adhering and laminating a carcass ply constituting a reinforcement member including, for example, an inner liner, a rubber chafer and a cord comprising a rubber material on a peripheral face of a building drum, building a bead or a side wall on a first stage building drum to constitute a green case, successively, transferring the green case to a second stage drum capable of carrying out a shaping deformation for second stage building, deforming the green case in a toroidal shape (shaping deformation), and building a green tire by adhering a belt, a tread rubber and the like thereon.

In recent years, there is also proposed a method of building a green tire by laminating and building a belt and a tread rubber to be laminated on a carcass band in a shape of a circular cylinder by a separate step and combining the belt/tread band and the carcass band on the second stage building drum. Further, it is also proposed to build a side wall on the second stage building drum.

Meanwhile, a building drum for the second stage building including the shaping deformation is constituted by including a pair of left and right drum portions having bead lock means for holding both side bead portions of a green case constituting an intermediate build member of a tire respectively in a lock state, the two drum portions are provided along a drum shaft to be able to be proximate to and distant from each other in an axial direction, in the shaping deformation, the two drum portions including the bead lock means are moved in directions of being proximate to each other, further, after detaching the built green tire, the two drum portions are constituted to move in directions of being distant from each other.

Normally, as exemplified in Reference 1 shown below, the drum shaft of the building drum constitutes a double shaft structure of an outer side shaft portion in a shape of a cylinder for rotating the two drum portions, and a screw 5 shaft rotatably inserted to inside of the outer side shaft portion and formed with screw portions in directions reverse to each other at left and right portions in the axial direction, the two drum portions are connected to moving members fitted to the outer side shaft portion unrotatably and movably in the axial direction relative thereto and screwed to respective screw portions of the left and right portions of the screw shaft, and the two drum portions are constituted to move to be proximate to and distant from each other along with the bead lock means by screw feeding operation of the screw portions with rotation of the screw shaft.

Further, also in a band building drum which is a drum of building a carcass band and a belt band and in which a drum main body is constituted by segments divided into a plurality thereof in a peripheral direction, as exemplified in Reference 2 shown below, there is known a mechanism of constituting a drum shaft by a double shaft structure of an outer side shaft portion in a shape of a cylinder and a screw shaft at inside thereof and operating to expand and contract the respective segments by moving the moving member in the axial direction by rotating the screw shaft.

Patent Reference 1: U.S. Pat. No. 3,971,694 specification
Patent Reference 2: JP-A-2003-89158

DISCLOSURE OF THE INVENTION

Problems that the Invention is to Solve

A driving apparatus of a building drum for a tire of the second stage building drum, the band building drum or the like, it is necessary to drive to rotate the outer side shaft portion of the drum shaft and drive to rotate the screw shaft.

However, in mounting two driving means (motors or the like) by respectively separately providing drive sources for driving to rotate the both shafts of the outer side shaft portion of the drum shaft and the screw shaft on the inner side, mounting cost is increased, it is also necessary to ensure a mounting space of the two rotation driving means, further, by increasing a weight of the total of the apparatus, when the apparatus is installed assumedly on a moving support base to move, the apparatus may be disadvantageous.

Hence, according to the invention, the above-described problem is resolved by enabling one piece of rotation driving means to be utilized for driving to rotate both shafts of the outer side shaft portion in the drum shaft and the screw shaft on an inner side as a driving apparatus of a building drum for a tire of a second stage building drum, a band building drum or the like.

Means for Solving the Problems

The invention is directed to a driving apparatus of a building drum for a tire including a drum shaft of a double shaft structure, characterized by including an outer shaft connected to an outer side shaft portion of the drum shaft, a middle shaft connected to an inner side shaft of the drum shaft, one piece of rotation driving means connected to the middle shaft by way of a rotation transmitting member, and a connecting and disconnecting clutch interposed between the middle shaft or the rotation transmitting member connected to be fixed to the middle shaft and the outer shaft, wherein the driving apparatus is constituted such that in connecting the clutch, rotation of the rotation driving means is transmitted to both of the middle shaft and the outer shaft, and in cutting the clutch, the rotation of the rotation driving means is transmitted only to the middle shaft.

According to the driving apparatus of the invention, in outputting by rotation of the outer side shaft portion of the drum shaft of a double shaft structure, for example, in rotating building drum, the clutch is brought into a connecting state. Thereby, rotation of the rotation driving means is transmitted to both of the middle shaft and the outer shaft by way of the rotation transmitting member, simultaneously with transmitting rotation to the inner side shaft of the drive shaft by the middle shaft, rotation is transmitted also to the outer side shaft portion by the outer shaft, and the building drum is rotated. At this occasion, the inner side shaft is rotated by the same speed in synchronism with the outer side shaft portion, and therefore, outputting by rotation of the inner side shaft (for example, screw shaft) is not carried out.

Further, in outputting to rotate the inner side shaft relative to the outer side shaft of the drum shaft, the clutch is brought into a cutting state (disconnecting state). Thereby, rotation of the rotation driving means is not transmitted to the outer shaft but transmitted only to the middle shaft, in accordance with rotation of the middle shaft, also the inner side shaft connected thereto is rotated relative to the outer side shaft portion and outputting by rotation of the inner side shaft is carried out.

Particularly, when the building drum for a tire is a building drum including a pair of left and right drum portions provided to be able to be proximate to and distant from each other along the drum shaft, the inner side shaft of the drum shaft comprises a screw shaft formed with screw portions in directions reverse to each other at left and right portions in an axial direction, the two drum portions are provided unrotatably and movably in the axial direction relative to the outer side shaft portion, and provided to move to be proximate to or distant from each other by a feed operation by the two screw portions by rotation of the screw shaft relative to the outer side shaft portion, the outer shaft is connected to the outer side shaft portion of the drive shaft of the building drum, and the middle shaft is connected to the screw shaft, rotation of the building drum and movement for making the two drum portion proximate to or distant from each other are preferably carried out.

That is, in rotating the building drum by rotating the outer side shaft portion, when the clutch is brought into the connecting state, as described above, rotation of the rotation driving means is transmitted to both of the middle shaft and the outer shaft, and the building drum is rotated by rotating the outer side shaft portion of the drum shaft. At this occasion, the screw shaft constituting the inner side shaft is rotated by the same speed in synchronism with the outer side shaft portion, and therefore, the two drum portions are not moved to be proximate to and distant from each other.

Further, when the two left and right drums are made to be proximate to or distant from each other, the clutch is brought into the cutting state. Thereby, rotation of the rotation driving means is transmitted only to the middle shaft, in accordance with rotation of the middle shaft, also the screw shaft connected thereto is rotated relative to the outer side shaft portion. Therefore, the two drum portions are moved in the direction of being proximate to each other or distant from each other by a feed operation of the two screw portions of the screw shaft.

There can be constructed a constitution in which the pair of left and right two drum portions in the tire building drum include bead lock means for respectively holding both side bead portions of a green case constituting an intermediate build member of a tire, thereby, the invention can excellently be carried out in the second stage building drum including the bead lock means.

In the driving apparatus, it is preferable that the clutch is an air clutch comprising an air tube capable of charging and discharging air, thereby, a connecting and disconnecting operation of power transmission by switching the clutch in being operated can smoothly be carried out.

Further, there can be constructed a constitution in which the rotation transmitting member includes a cylinder portion rotatably fitted to an end portion on a side opposed to a drum support side of the outer shaft, and a hanging rotation portion a diameter of which is larger than a diameter of the cylinder portion and which is connected to an output shaft of the rotation driving means transmittably by an endless pivoting member, and an air clutch comprising an air tube in a ring-like shape capable of charging and discharging air is arranged between the cylinder portion and a connecting portion in a cylinder shape projected from a flange-like plate on the outer shaft on an outer side thereof. Thereby, the connecting and disconnecting operation by switching the clutch in being operated can smoothly be carried out and further, transmission of the rotating torque from the rotation transmitting member brought into the connecting state to the outer shaft can firmly be carried out.

In the driving apparatus, there can be constructed a constitution in which a portion of the outer shaft is formed with a notch in a slit-like shape in the axial direction, a screw portion is formed at a portion of the middle shaft in correspondence with the notch, an outer periphery of the outer shaft is provided with moving members connected to a screwing portion relative to the screw portion of the middle shaft by way of the notch and moved in the axial direction in accordance with rotation of the middle shaft, and constituted to detect and restrict a movement of making the two drum portions proximate to and distant from each other by rotation of the screw shaft of the drum shaft by detecting the movement of the moving member. Thereby, rotation of the middle shaft, that is, movement of the two left and right drum portions by rotation of the screw shaft connected to the middle shaft can easily be detected and a constant or more of movement can be restricted.

In the above-described driving apparatus, there can be constructed a constitution in which the driving apparatus is constituted by providing an air charging and discharging port portion constituting an air charging and discharging member in a ring-like shape through which a portion of the outer shaft is rotatably penetrated for opening and closing the left and right bead lock means, an air charging and discharging port portion for an inner pressure filling portion for shaping, and an air charging and discharging port portion for an air clutch, and constituted to be able to charge and discharge air respectively to the bead lock means, the inner pressure filling portion for shaping and the air clutch by way of air paths formed from the respective port portions to inside of the outer shaft. Thereby, a locking operation by the left and right bead lock means, a shaping operation by filling the inner pressure and an operation of connecting and disconnecting the clutch can firmly be carried out and further, a tube or the like for charging and discharging air is dispensed with at outside of the shaft portion of the apparatus.

Further, according to the invention, the pair of left and right drum portions do not necessarily indicate only a drum having cylinder barrel portions but include also drum portions including a lock mechanism or the like for carrying out operation of expanding or contracting the bead lock means.

Advantage of the Invention

As described above, according to the driving apparatus of the building drum for a tire of the invention, by connecting and disconnecting a transmitting state by switching the clutch, outputting by rotation of the building drum by rotation of the outer side shaft portion of the drum shaft of the double shaft structure and rotation of the screw shaft constituting the inner side shaft, for example, operation of making the pair of left and right two drum portions proximate to and distant from each other can be carried out by constituting a drive source by one piece of the rotation driving means. Therefore, in comparison with a case of mounting two rotation driving means, mounting cost can be reduced, the apparatus can be constituted to be compact, also an increase in a weight thereof can be restrained, and the apparatus is made to be advantageous even when the apparatus is installed on a moving support base to be moved.

BEST MODE FOR CARRYING OUT THE INVENTION

An embodiment of the invention will be explained based on examples shown in the drawings as follows.

FIG. 1 is a sectional view showing an embodiment of a driving apparatus of a building drum for a tire of the invention, FIG. 2 is a sectional view enlarging a portion of the apparatus, FIG. 3 is an enlarged sectional view taken along a line III-III of the preceding drawing, FIG. 4 is an outline sectional view showing a mechanism of making two left and right drum portions of a building drum proximate to and distant from each other.

A building drum D for a tire of an illustrated example is a second stage building drum laminating a green case constituting an intermediate build member of a tire, that is, an inner liner and a carcass ply, subjecting the green case G built with a bead and the like to a shaping deformation in a toroidal shape, and building a green tire pasted and laminated with a belt, a tread rubber and the like thereon.

The building drum D is constituted by supporting a pair of left and right drum portions Da, Db having bead lock means 2a, 2b for respectively holding both side bead portions of the green case to be able to be proximate to and distant from each other along a drum shaft 1. Further, FIG. 1 shows an outline by omitting inner mechanisms of the drum portions Da, Db.

The drum shaft 1 is constituted by an outer side shaft portion 3 in a shape of a cylinder for rotating the drum, and a screw shaft 4 constituting an inner side shaft rotatably penetrated to an inner portion of the outer side shaft portion 3. The screw shaft 4 is formed with screws (right screw and left screw) in directions reverse to each other at left and right portions in the axial direction. Notations 4a, 4b designate the left and right screw portions. The left and right drum portions Da, Db are respectively fitted to the outer side shaft portion 3 unrotatably and movably in the axial direction by means of spline fitting or the like and connected to moving members 5a, 5b screwed to the left and right screw portions 4a, 4b of the screw shaft 4, and the two drum portions Da, Db are constituted to move to be proximate to and distant from each other along with the bead lock means 2a, 2b by a feed operation by the two screw portions 4a, 4b by rotating the screw shaft 4 relative to the outer side shaft portion 3. Directions of moving to be proximate to and distant from each other are determined by a direction of rotating the screw shaft 4, when, for example, moved to be proximate to each other by right rotation, the two drum portions are moved to be distant from each other by left rotation. The two screw portions 4a, 4b are formed at least over ranges of moving the two drum portions Da, Db.

The bead lock means 2a, 2b respectively provided to the two drum portions Da, Db are constituted to be provided to carry out locking and lock releasing by expanding a diameter and contracting the diameter by, for example, charging and discharging air, and a mechanism well known in the background art can be utilized, and therefore, a detailed explanation thereof will be omitted. Further, although an inner pressure filling portion of a bladder (not illustrated) or the like capable of charging and discharging air for the shaping deformation is provided at a portion between the two drum portions Da, Db, also a mode and a constitution of the inner pressure filling portion and a mechanism of extraction and contraction by charging and discharging air and the like can utilize mechanisms well known in a background art, and therefore, a detailed explanation thereof will be omitted. Further, as the inner pressure filling portion for shaping, as a substitute for the bladder, there can also be utilized a bladderless mechanism for expanding the diameter by utilizing the inner pressure while approaching the widths of the beads by filling the inner pressure by using, for example, an airtight bead lock mechanism.

A driving apparatus 10 of the invention drives to rotate the outer side shaft portion 3 at the drum shaft 1 of the building drum D and the screw shaft 4 on the inner side in accordance with rotation of the two drum portions Da, Db and operation of making the two drum portions Da, Db proximate to and distant from each other in a building operation. A main shaft portion 11 of the driving apparatus 10 constitutes a double shaft structure of an outer shaft 13 connected with the outer side shaft portion 3 of the building drum D and a middle shaft 14 connected with the screw shaft 4. Notation 6 designates a connecting portion of the outer side shaft portion 3 and the outer shaft 13 by bolt fastening, notation 7 designates a connecting portion of the screw shaft 4 and the middle shaft 14 by a square shaft engagement or the like.

In the case of the drawing, the outer shaft 13 of the main shaft portion 11 is rotatably supported by bearings 41, 41 provided at a plurality of portions (2 portions in the drawing) by being spaced apart from each other in an axial direction above a moving support base 40, thereby, the building drum D connected to the main shaft portion 11 is provided to be supported in a cantilever style. The middle shaft 14 is supported by a bearing 15 arranged on an inner side of the outer shaft 13 at a portion thereof at a vicinity of an end portion on a drum support side, and is supported by a bearing bush 16 arranged between an end portion on a side opposed to the drum support side and an end portion of the outer shaft 13.

The end portion of the middle shaft 14 on the side opposed to the drum support side is attached with a rotation transmitting member 18 connected to rotation driving means 17 rotatable regularly and reversely of a motor or the like. The rotation transmitting member 18 is constituted by a cylinder portion 18a rotatably fitted to the end portion on the side opposed to the drum support side of the outer shaft 13 by way of a bearing 19, and a hanging rotation portion 18b of a pulley or the like having a diameter larger than that of the cylinder portion 18a and hung with an endless pivoting member 20 of a belt or the like for connecting to the rotation driving means 17, and the hanging rotation portion 18b is fixed to a fixing member 21 fixed to the end portion of the middle shaft 14 by screw fastening means. Further, the belt constituting a pivoting member 20 is hung between the hanging rotation portion 18b constituted by the pulley and a hanging rotation portion 22 constituted by a pulley on an output shaft 17a of the rotation driving means 17 and provided to be able to transmit the rotation of the rotation driving means 17 to the middle shaft 14.

As the pivoting member 20, an endless chain can also be used in place of the belt, in this case, the hanging rotation portion 18b of the rotation transmitting member 18 and the hanging rotation portion 22 on the output shaft 17a may be constituted by sprockets capable of hanging the chain.

A clutch 26 for connecting and disconnecting, particularly, an air clutch comprising an air tube 26a in a ring-like shape capable of charging and discharging air is arranged between the cylinder portion 18a of the rotation transmitting member 18 and a connecting portion 25 in a shape of a cylinder projected from a flange-like plate 24 fixed onto the outer shaft 13 on an outer side thereof and provided to be able to switch the rotation transmitting member 18 connectably and disconnectably relative to the outer shaft 14, that is, switch to a connecting state of transmitting rotation of the rotation transmitting member 18 to the outer shaft 14 and a cutting state (disconnecting state) of not transmitting rotation by a switching operation of the clutch 26 by charging and discharging air.

Although as the clutch 26, a general clutch of other friction clutch, a mesh clutch or the like can also be used, in view of carrying out the invention, it is preferable to utilize the air clutch as shown by the drawing in view of an easiness in an operation control. Further, although the invention can also be carried out by interposing the similar clutch between the end portion of the outer shaft 13 and the middle shaft 14 separately from the rotation transmitting member 18, it is preferable to carry out the invention by constituting the invention to be able to transmit a rotation torque on an outer side of the outer shaft 13 as shown by the drawing in firmly transmitting the rotation torque from the middle shaft 14 to the outer shaft 13 when connected.

A notch 27 in a shape of a slit in the axial direction is formed at a portion of the outer shaft 13 in the main shaft portion 11, for example, a portion between the two bearings 41, 41, a screw portion 28 is formed at a portion of the middle shaft 14 in correspondence with the notch 27, an outer periphery of the outer shaft 13 is provided with a moving member 30 in a ring-like shape connected to a screwing portion 29 screwed to the screw portion 28 of the middle shaft 14 by way of the notch 27 and moved in the axial direction in accordance with rotation of the middle shaft 14, and provided to detect and restrict movements of making the two drum portions Da, Db proximate to and distant from each other by rotating the screw shaft 4 of the drum shaft 1 by detecting a movement of the moving member 30. For example, vicinities of both ends of a range of moving the moving member 30 are provided with proximity switches 31 operated by making the moving member 30 proximate thereto to be constituted to restrict further movement by stopping to drive the rotation by the rotation driving means 17 by operating the proximity switch 31.

Further, an outer peripheral portion of the main shaft portion 11 is provided with air charging and discharging members 32 in a ring-like shape penetrated by a portion of the outer shaft 13 rotatably. The air charging and discharging member 32 is provided with air charging and discharging port portions 33a, 34a; 33b, 34b for respectively opening and closing the left and right bead lock means 2a, 2b of the building drum D, an air charging and discharging port portion 35 for an inner pressure filling portion for shaping, and an air charging and discharging port portion 36 for the air clutch, constituted to be able to charge and discharge air respectively to the bead lock means 2a, 2b, the inner pressure filling portion for shaping and the clutch 26 from the respective port portions 33a, 34a; 33b, 34b, 35, 36 by way of individual air paths 37 or 38 formed at inside of the outer shaft 13 by operating air supply means, not illustrated, thereby, the bead lock means 2a, 2b, the inner pressure filling portion for shaping and the clutch 26 are made to be able to be operated pertinently.

Further, the rotation driving means 17, the bead lock means 2a, 2b, and the clutch 26 or the like are controlled to operate respectively by an instruction from a control portion (not illustrated). Particularly, the rotation driving means 17 is constituted to rotate regularly or rotate reversely by a signal of instructing the rotation direction from the control portion, thereby, constituted to be able to pertinently select a direction of moving the moving member 5 and to be able to move to make the two drum portions Da, Db proximate to each other or move to make the two drum portions distant from each other by regularly rotating or reversely rotating the screw shaft 4. Further, the clutch 26 is set to be brought into the connecting state only in rotating the drum.

An explanation will be given of an operating state of the building drum D for a tire by the driving apparatus 10. In a state of holding and locking the both side bead portions of the green case constituting the intermediate building member of the tire at the respective bead lock means 2a, 2b of the two left and right drum portions Da, Db, when the building drum D is rotated, the clutch 26 is brought to the connecting state. For example, when the air clutch as shown by the drawing is utilized, by supplying air to the air tube 26a by way of the air charging and discharging port portion 36 and the air path 38, the air tube 26a is expanded to bring the cylinder portion 18a of the rotation transmitting member 18 fixed to the shaft 14 and the connecting portion 25 in the shape of the cylinder fixed to the side of the outer shaft 13 into close contact with each other. Thereby, rotation of the rotation driving means 17 is transmitted to both of the middle shaft 14 and the outer shaft 13 by way of the rotation transmitting member 18, simultaneously with transmitting rotation to the screw shaft 4 on the inner side of the drum shaft 1 by the middle shaft 14, rotation is transmitted also to the outer side shaft portion 3 by the outer shaft 13, and the building drum D is rotated. At this occasion, the screw shaft 4 is rotated by the same speed in synchronism with the outer side shaft portion 3, and therefore, the two drum portions Da, Db are not moved to be proximate to and distant from each other.

Further, when the two left and right drum portions Da, Db are made to be proximate to or distant from each other, by bringing the clutch 26 into the cutting state (disconnecting state), for example, discharging air of the air tube 26a of the air clutch, the rotation is brought into a state of not being transmitted to the outer shaft 13. Thereby, rotation of the rotation driving means 17 is not transmitted to the outer shaft 13, and transmitted only to the middle shaft 14, and in accordance with rotation of the middle shaft 14, also the screw shaft 4 of the drum shaft 1 connected thereto is rotated relative to the outer side shaft portion 3. Therefore, by connecting the two drum portions Da, Db to the moving members 5a, 5b screwed to the two left and right screw portions 4a, 4b of the screw shaft 4 as shown by the drawing, in accordance with moving the moving members 5a, 5b by a feed operation by rotation of the screw shaft 4, the two drum portions Da, Db are moved to be proximate to or distant from each other along with the bead lock means 2a, 2b provided thereto.

For example, the two drum portions Da, Db are moved to be proximate to each other along with the bead lock means 2a, 2b provided thereto by rotation in one of the left and right directions of the screw shaft 4, and in accordance with the movement, the green case is subjected to the shaping deformation by supplying air to the inner pressure filling portion for the shaping provided between the two drum portions Da, Db. In this way, the building drum D is rotated as described above, a belt and a tread rubber is laminated and stitched to an outer side of the green case, etc., and the green tire is built. The built green tire is detached from the building drum D to take out by shrinking the bladder and releasing locking by the bead lock means 2a, 2b.

Thereafter, the two drum portions Da, Db are made to be distant from each other, at this occasion, the screw shaft 4 is rotated in a direction reverse to the above-described by reversely rotating the rotation driving means 17. Thereby, the two drum portions Da, Db are moved to be distant from each other along with the bead lock means 2a, 2b.

In this way, rotation of the two drum portions Da, Db including the left and right bead lock means 2a, 2b of the second stage building drum, and approaching and separating operations can be carried out by one drive source by switching the clutch 26.

Further, according to the driving apparatus of the invention, the building drum for the tire constituting a drive object is not necessarily limited to the second stage building drum including the bead lock means of the above-described embodiment but the driving apparatus of the invention can be utilized similar to the above-described embodiment also in other building drum which includes a pair of left and right drum portions capable of being proximate to and distant from each other and in which a drum shaft constitutes a double shaft structure of an outer side shaft portion and a screw shaft constituting an inner side shaft.

Further, the driving apparatus of the invention can be embodied even in a case in which a building drum for a tire of a drive object is a band building drum including a drum main body comprising a segment divided into a plurality thereof in a peripheral direction, provided with the respective segments unrotatably to the outer side shaft portion and displaceably in a diameter direction, and provided to be displaced to expand and contract by way of displacing means for converting a displacement in an axial direction into a displacement in a diameter direction by rotation of a screw shaft constituting an inner side shaft relative to the outer side shaft portion of a drum shaft of a double shaft structure, by connecting respectively the outer shaft of the driving apparatus of the invention to the outer side shaft portion of the drum shaft of the building drum and the middle shaft to the screw shaft on the inner side.

Also in this case, rotation of the drum and operation of expanding and contracting the drum main body can be carried out by one drive source by selecting a case of transmitting rotation of the one rotation driving means to both of the outer side shaft portion and the screw shaft and a case of transmitting the rotation only to the screw shaft on the inner side by switching the clutch.

INDUSTRIAL APPLICABILITY

The driving apparatus of the building drum for the tire of the invention can preferably be utilized in the tire building drum of the second stage building drum which carries out operation of making the two drum portions including the left and right bead lock means proximate to and distant from each other and drum operation or the band building drum of carrying out rotation and the contracting operation or the like.

DESCRIPTION OF REFERENCE NUMERALS AND SIGNS

Figure 1:
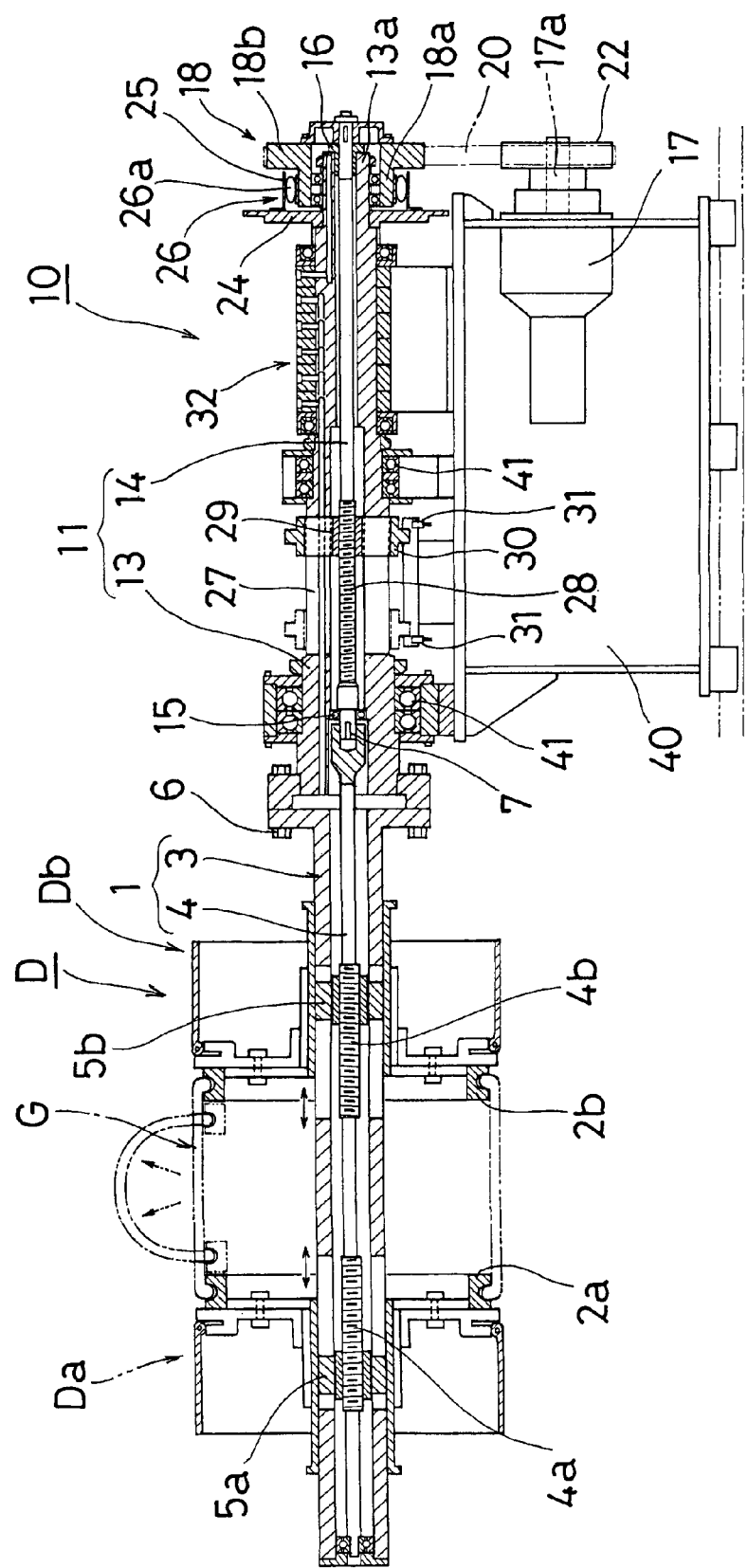
FIG. 1 is a sectional view showing an embodiment of a driving apparatus of a building drum for a tire of the invention.
Figure 2:
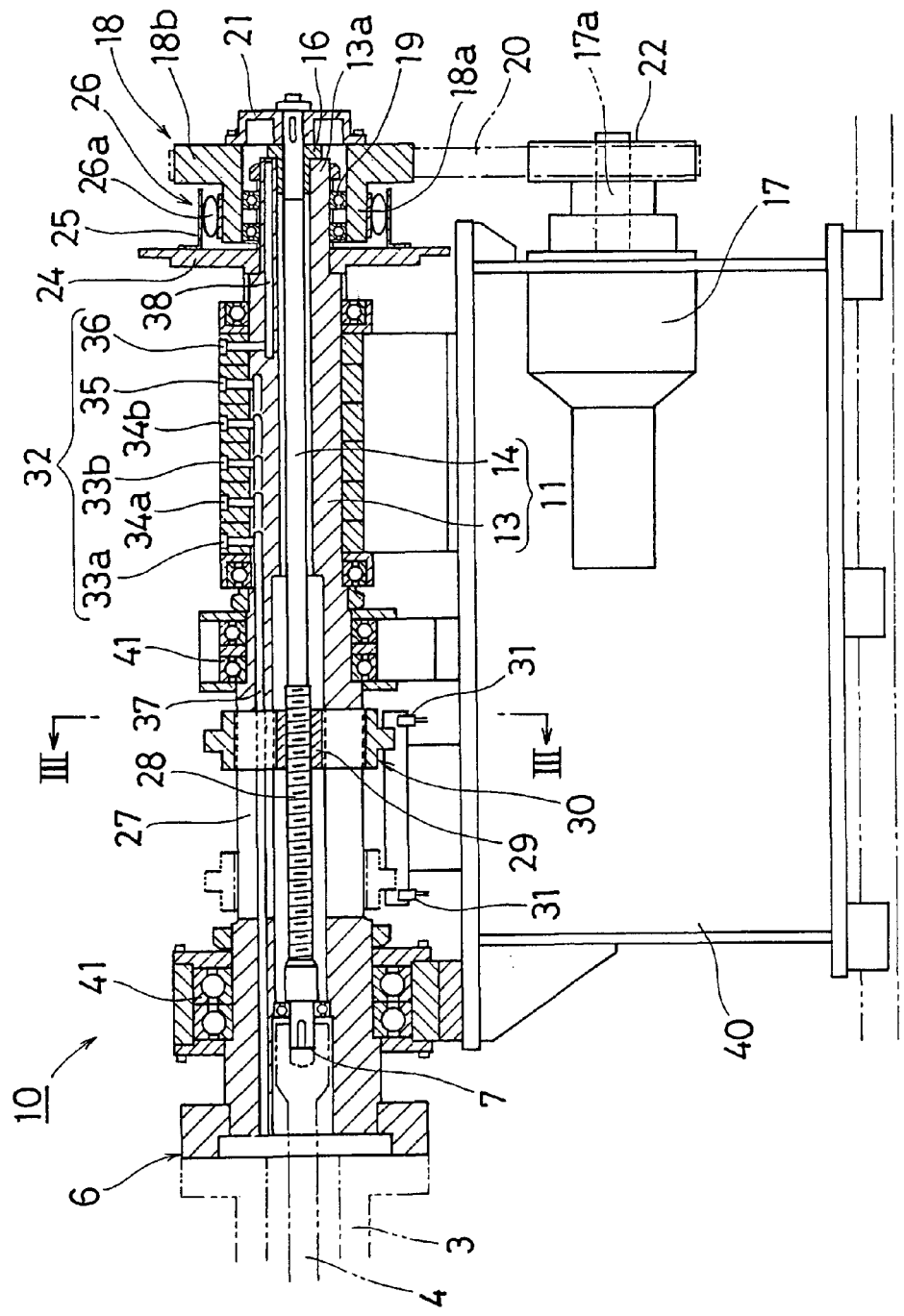
FIG. 2 is a sectional view enlarging a portion of the apparatus.
Figure 3:
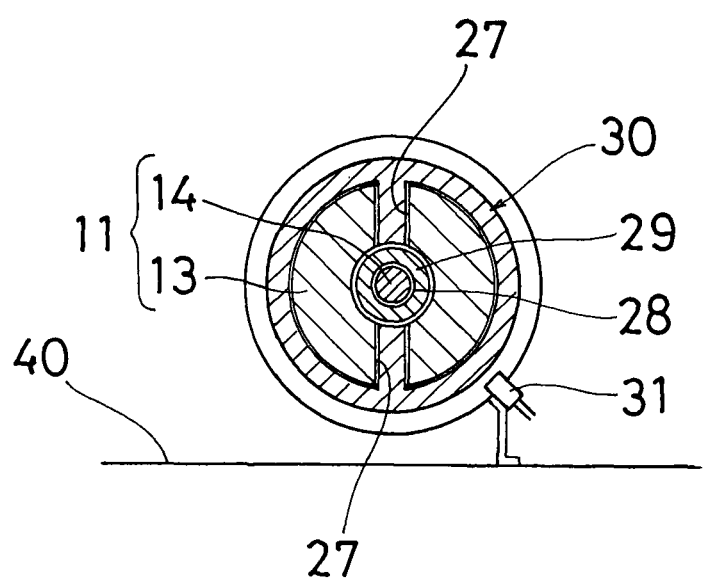
FIG. 3 is an enlarged sectional view taken along a line III-III of the apparatus.
Figure 4:
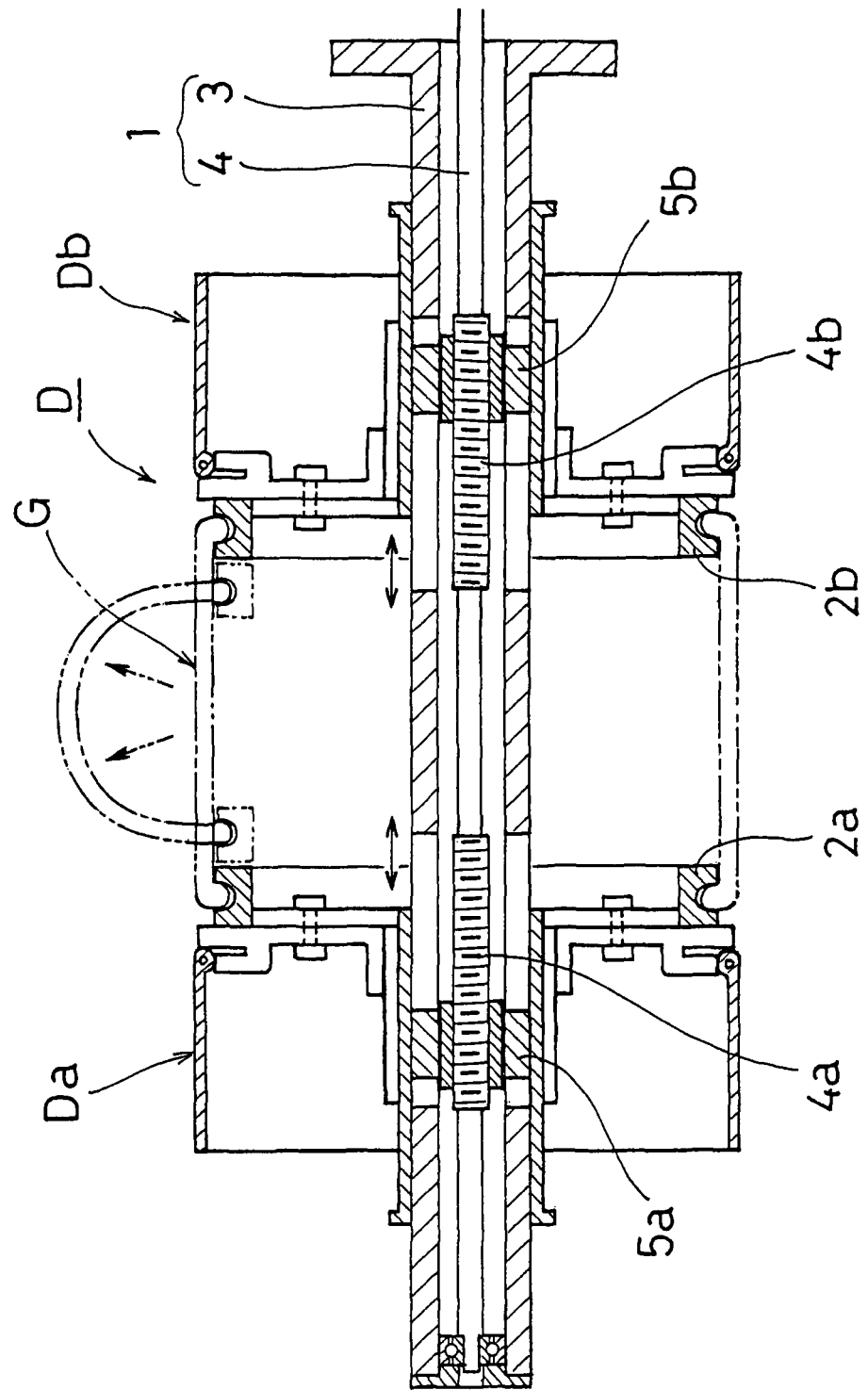
FIG. 4 is an outline sectional view showing a mechanism of making building drums proximate to and distant from each other.

D . . . building drum, Da, Db . . . drum portions, G . . . green case, 1 . . . drum shaft, 2a, 2b . . . bead lock means, 3 . . . outer side shaft portion, 4 . . . screw shaft, 4a, 4b . . . two screw portions, 5a, 5b . . . moving members, 6, 7 . . . connecting portions, 10 . . . driving apparatus, 11 . . . main shaft portion, 13 . . . outer shaft, 13a . . . end portion, 14 . . . middle shaft, 15 . . . bearing, 16 . . . bearing bush, 17 . . . rotation driving means, 17a . . . output shaft, 18 . . . rotation transmitting member, 18a . . . cylinder portion, 18b . . . hanging rotation portion, 19 . . . bearing, 20 . . . pivoting member, 21 . . . fixing member, 22 . . . hanging rotation portion, 24 . . . flange-like plate, 25 . . . connecting portion, 26 . . . clutch, 27 . . . notch, 28 . . . screw portion, 29 . . . screwing portion, 30 . . . moving member, 31 . . . proximity switch, 32 . . . air charging and discharging member, 33a, 34a; 33b, 34b, 35, 36 . . . air charging and discharging port portions, 37, 38 . . . air paths, 40 . . . moving support base, 41, 41 . . . bearings.

The invention claimed is:

1. A driving apparatus of a building drum for a tire including a drum shaft of a double shaft structure, characterized by comprising:

an outer shaft connected to an outer side shaft portion of the drum shaft;

a middle shaft connected to an inner side shaft of the drum shaft;

a single rotation drive source connected to the middle shaft by way of a rotation transmitting member; and a connecting and disconnecting clutch interposed between the middle shaft or the rotation transmitting member connected to be fixed to the middle shaft and the outer shaft;

wherein the driving apparatus is constituted such that in connecting the clutch, rotation of the rotation drive source is transmitted to both of the middle shaft and the outer shaft, and in cutting the clutch, the rotation of the rotation drive source is transmitted only to the middle shaft;

wherein the building drum for a tire is a building drum including a pair of left and right drum portions provided to be able to be proximate to and distant from each other along the drum shaft, the two drum portions are provided unrotatably and movably in the axial direction relative to the outer side shaft portion, the inner side shaft comprises a screw shaft formed with screw portions in directions reverse to each other at left and right portions in an axial direction, and portions of the outer side shaft portion in correspondence with the screw portions of the inner side shaft are formed with notches;

wherein the two drum portions are connected to screwing portions relative to the screw portions of the inner side shaft by way of the notches of the outer side shaft portion, and thereby provided for an outer periphery of the outer side shaft portion to move to be proximate to or distant from each other by a feed operation by the two screw portions by rotation of the screw shaft relative to the outer side shaft portion, the outer shaft is connected to the outer side shaft portion of the drive shaft of the building drum, and the middle shaft is connected to the screw shaft; and wherein a portion of the outer shaft is formed with a notch in a slit shape in the axial direction, a screw portion is formed at a portion of the middle shaft in correspondence with the notch, an outer periphery of the outer shaft is provided with a moving member connected to a screwing portion relative to the screw portion of the middle shaft by way of the notch of the outer shaft and moved in the axial direction in accordance with rotation of the middle shaft, and the driving apparatus is constituted to detect and restrict a movement of making the two drum portions proximate to and distant from each other by rotation of the screw shaft of the drum shaft by detecting the movement of the moving member; and wherein at least one proximity sensor for detecting the movement is provided and is spaced apart from the outer shaft, and wherein said at least one proximity sensor includes a proximity sensor in a vicinity of an end portion of a range of movement of the moving member.

2. The driving apparatus of a building drum for a tire according to claim 1, wherein the pair of left and right two drum portions include bead locks for respectively holding both side bead portions of a green case constituting an intermediate build member of a tire.

3. The driving apparatus of a building drum for a tire according to any one of claims 1 through 2, wherein the clutch is an air clutch comprising an air tube capable of charging and discharging air.

4. The driving apparatus of a building drum for a tire according to claim 1,
wherein the clutch is an air clutch comprising an air tube capable of charging and discharging air;
wherein the rotation transmitting member includes a cylinder portion rotatably fitted to an end portion on a side opposed to a drum support side of the outer shaft, and a hanging rotation portion a diameter of which is larger than a diameter of the cylinder portion and which is connected to an output shaft of the rotation drive source transmittably by an endless pivoting member, and an air clutch comprising an air tube in a ring shape capable of charging and discharging air is arranged between the cylinder portion and a connecting portion in a cylinder shape projected from a flange plate on the outer shaft on an outer side thereof.

5. The driving apparatus of a building drum for a tire according to claim 4, wherein the driving apparatus is constituted by providing an air charging and discharging port portion constituting an air charging and discharging member in a ring shape through which a portion of the outer shaft is rotatably penetrated for opening and closing the left and right bead locks, an air charging and discharging port portion for an inner pressure filling portion for shaping, and an air charging and discharging port portion for an air clutch, and constituted to be able to charge and discharge air respectively to the bead lock, the inner pressure filling portion for shaping and the air clutch by way of air paths formed from the respective port portions to inside of the outer shaft.

6. The driving apparatus of a building drum for a tire according to claim 4, wherein said cylinder portion is rotatably fitted to said end portion of said outer shaft via a bearing, and wherein said rotation transmission member is fixedly connected to an end portion of said middle shaft.

7. The driving apparatus of a building drum for a tire according to claim 1,
wherein said at least one proximity sensor includes two proximity sensors for detecting the movement, and
wherein the proximity sensors are in vicinities of both end portions of the range of movement of the moving member.

* * * * *